Figure 1:
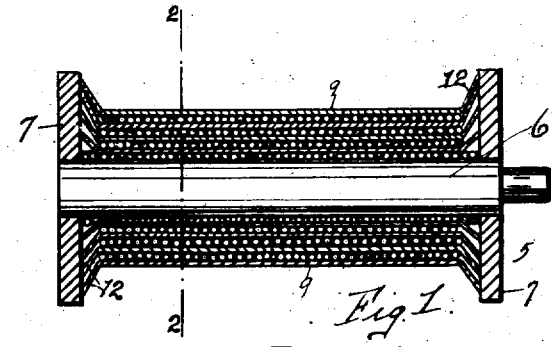

H. A. RHODES.

HEAT DISSIPATING MEANS FOR ELECTRICAL APPARATUS.

APPLICATION FILED JULY 8, 1911.

Reissued Mar. 24, 1914. 13,704.

WITNESSES

O. M. Bainbridge.

K. Solbey.

INVENTOR

Harry A. Rhodes

By Harry Lea Dodson

Attorney.

BEST AVAILABLE COPY

UNITED STATES PATENT OFFICE.

HARRY A. RHODES, OF DENVER, COLORADO, ASSIGNOR TO THE UNIVERSAL MOTOR COMPANY, OF DENVER, COLORADO, A CORPORATION OF ARIZONA.

HEAT-DISSIPATING MEANS FOR ELECTRICAL APPARATUS.

13,704. Specification of Reissued Letters Patent. Reissued Mar. 24, 1914.

Original No. 981,690, dated January 17, 1911, Serial No. 517,467. Application for reissue filed July 8, 1911. Serial No. 637,566.

*To all whom it may concern:*

Be it known that I, HARRY A. RHODES, a citizen of the United States of America, residing in the city and county of Denver and State of Colorado, have invented certain new and useful Improvements in Heat-Dissipating Means for Electrical Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improved means for dissipating heat from electrical and other machinery or apparatus or material, but is more especially intended for dissipating the heat developed in the wires or conductors forming the coils of electrical translating devices.

It is a fact well known that when a conductor is traversed by a current of electricity, the conductor is heated thereby to a definite extent in accordance with well known physical and electrical laws. The heat thus developed may accumulate in the conductor to such an extent as to cause the burning and consequent destruction of the conductor or for the attendant insulating material, or both, unless means are employed to prevent undue heating of the conductors and insulating material of apparatus of this character, as for example, the electro-magnetic field and armature windings of dynamos and motors, etc. These machines may easily be destroyed by the heating effect of the operating electrical current. Among the means so far employed for obviating said destructive effects, I will cite the usual precautions taken by electrical machine designers to provide, so far as possible, for air ventilation in open spaces surrounding the magnet windings or sections thereof, and by limiting the depth or other dimensions of the magnet coil or section winding in proportion to the available air spaces, and by the provision of air ducts through the spiders and windings of the armatures, and in general to provide to as large an extent as possible, for an open or skeleton construction of the machine or apparatus to afford a maximum circulation of air through or adjacent to the windings. Such means, while beneficial, do not effect the greatest possible immunity from destructive heating results, especially when as in many cases, of use in mines, planing mills, etc., it is necessary to inclose the motor, or other electrical apparatus, in an air or water tight case.

As the power of an electrical machine is directly proportional to the current given out or taken in by it, and as the safe current by which the conductor in the machine may be traversed, is limited by the maximum temperature which the conductor and insulating material will stand without damage, it is obvious that the capacity of a given machine may be increased if suitable means be provided to prevent an undue rise of temperature in the machine.

The object of my invention is to provide means whereby the heat generated by the current in electrical machines, may be economically and safely conveyed or conducted from the various sections of the machine to adjacent, or other radiating volumes or surfaces, where it is dissipated in accordance with the well known laws of heat radiation. For example, take the case of a simple electro-magnet spool or bobbin, constructed on a central iron core carrying metallic heads or end disks. Assume a proper length core to contain thirty convolutions of No. 16 B. & S. single cotton-covered wire and a depth or radius of the end disks to contain ten layers of this wire. Assume also a sufficient current to raise the temperature of the middle layer at the central point, 100 degrees Fahr. in five minutes. The rise of temperature is due to the low heat-conducting capacity of the cotton insulation lying between this point and the end disks, or the surrounding atmosphere; consequently if means be provided to increase the heat conductivity of these paths the heat generated will be more rapidly conveyed away from the windings and dissipated by the adjacent end disks and surrounding atmosphere, thus preventing an undue rise of temperature in the coil. I accomplish this object by serving the insulated conductor, in whole or in part, with a metallic or other heat conducting covering, and permitting of, or designedly connecting, this heat conducting covering with the adjacent end disks, or other volumes or surfaces and suitably adapted for radiating or

BEST AVAILABLE COPY conducting heat away. The efficiency of this method, other things being equal, depends upon the relative heat conducting values of the heat conductor chosen for serving the insulated conductor, being, for illustration, higher for silver than for tin, zinc or carbon. In applying this method, I have obtained highly beneficial results by serving the coil, after each layer is wound on, with tin, silver, or other foil from one to three one-thousandths of an inch thick, and permitting the foil to overlap the ends of the coil, thus connecting the foil with the metal end disks; but I do not confine myself to this method as it is obvious that the insulated conductor may be served before winding on the core with a heat conducting, non-impregnating foil, paint or paste; or such substance may be applied to the conductor during the process of winding; as, for illustration, pulverized tin, silver or lamp black worked to a non-impregnating paste in alcohol, or other suitable matrix, may be applied by brush after or during the process of winding each layer, by which method the interstices between adjacent conductors, windings or convolutions may be practically filled with a heat conducting, non-impregnating material much superior to the air normally present. It will thus be observed that it is not my intention to treat the insulated conductors of electrical apparatus with a substance which will impregnate or penetrate the insulation of these conductors, but simply to fill the spaces between and surrounding the same, or the convolutions, layers or windings thereof, in such a manner that a path or avenue of escape for the heat developed therein may be provided, said path being of such character that the heat will readily follow it and be rapidly and constantly removed and dissipated, practically as fast as it develops.

Having briefly outlined my improvement, I will proceed to describe the same in detail, reference being made to the accompanying drawing, in which is illustrated one form or embodiment of the invention.

Figure 2:
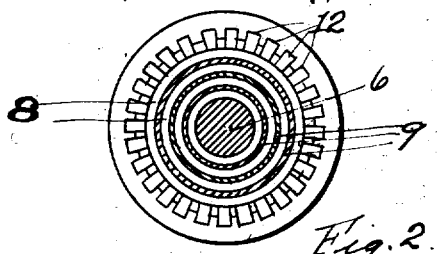
Figure 3:
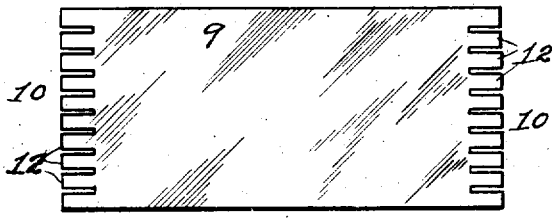
Figure 4:
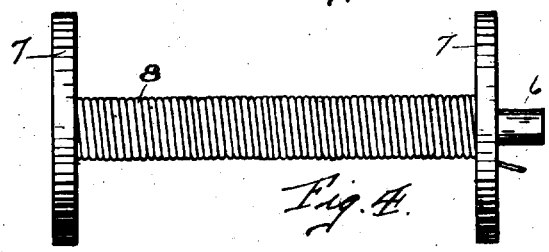

In this drawing: Figure 1 is a section taken through a spool carrying a series of coils of insulated wire, the said coils being separated by layers of heat-conducting, non-impregnating material for heat-dissipating purposes. Fig. 2 is a cross section taken on the line 2—2, Fig. 1. Fig. 3 is a detail view showing a sheet or section of relatively thin metal foil adapted for use in separating the layers or coils of insulated wires, when arranged as shown in Fig. 1. Fig. 4 is a spool upon whose spindle or core, a single layer or coil of wire is wound, the same being shown before the heat conducting layer or substance has been applied.

The same reference characters indicate the same parts in all the views.

Let the numeral 5 designate a spool composed of a core 6, and metal head 7. Upon this core and between the heads, are wound coils or spiral layers 8, of insulated wire, the said layers or coils being separated by relatively thin sheets 9, of metal foil which is of such character that it has a high coefficient of heat conductivity, and which shall at the same time be sufficiently refractory to prevent fusion or softening at ordinary temperatures. These layers of sheet metal foil are applied after each coil or layer of wire is wound upon the spool, the said layers or coils being thus separated by the heat conducting sheets from the innermost to the outermost layer of wire upon the spool. As shown in the drawings, the extremities of these sheets 9 are slotted or slitted, as shown at 10, to form a series of relatively short lips 12, the said lips extending a sufficient distance beyond the body of the sheet 9, to cause the lips to be outwardly bent or flared against the metal head 7, of the spool whereby the heat which uses these sheets as a path or avenue of escape, is carried to the metal head 7, taken up thereby and readily dissipated or discharged into the surrounding atmosphere.

In this drawing, it will be observed that no attempt has been made to illustrate more than a single form or embodiment of the invention. It will be understood, however, that many other forms of the nature heretofore outlined and non-impregnating in character may be employed, there being only one indispensable requirement or desideratum, viz: that the foil or substance shall be of such character as to form an easy path or avenue of escape for the heat developed within the coils or conductors of electrical apparatus, where the said coils, wires or conductors are so located, that the efficiency of the apparatus may be increased by dissipating the normal heat development therein. Where instead of the thin sheet metal foil illustrated, a non-impregnating paste is employed, this may be spread upon the successive layers or coils of wire as they are wound upon or applied to the spool or other apparatus.

Having thus described my invention, what I claim is:

1. Means for dissipating heat from the coils or conductors of an electrical apparatus, comprising a spool upon which layers of the coils or conductors are wound, a non-impregnating, heat-conducting substance applied to the spool and in engagement with the spool heads, the said substance separating the layers of coils or conductors thereof, and leading out of the conductors or coils to the air, forming a part for the escape of the heat developed in the apparatus, substantially as described.

2. The combination with a spool having

BEST AVAILABLE COPY metal heads and the conductors or coils thereof, of means applied to the said spool, and separating the layers or coils thereof for heat dissipating purposes, said means including relatively thin layers of heat conducting, non-impregnating material bent outwardly at their extremities and brought into engagement with the metal heads of the spool, the latter being of such character that, while possessing a high coefficient of heat conductivity, it shall also be sufficiently refractory to prevent softening or fusion at ordinary temperatures.

3. The combination with a spool having conductors or coils, of layers of sheet metal foil interposed between the conductors, coils or layers of coils of the apparatus, the extremities of the said sheets being slit and bent into engagement with the spool for heat dissipating purposes.

4. The combination with a spool having metal heads and an electrical conductor arranged in layers of coils upon the spool, of relatively thin layers of sheet metal foil interposed between the coils or windings of the apparatus, and extending outwardly, the extremities of the said sheets being brought into contact with the metal heads of the spool for heat dissipating purposes, substantially as described.

5. The combination with a spool having metal heads and electrical conductors arranged in coils on the spool, layers of relatively thin sheet metal foil interposed between the coils or windings of the conductors on the spool, the extremities of the said sheets being slitted, bent outwardly and brought into engagement with the metal heads of the spool for heat dissipating purposes, substantially as described.

6. In combination with a conductor of electricity wound in superposed layers, a conductor of heat flared at its ends interposed between the layers of the conductor of electricity, and a heat dissipating member contacted by the conductor of heat.

7. In combination with conductors of electricity extending approximately parallel, a conductor of heat between the conductors of electricity, and a heat dissipating member in contact with the ends of the conductor of heat.

8. In combination with a conductor of electricity in superposed layers, a conductor of heat interposed between the layers of the conductor of electricity, and a heat dissipating member contacted by the conductor of heat.

In testimony whereof, I affix my signature in the presence of two witnesses.

HARRY A. RHODES.

Witnesses:
H. GRONDAHL,
GUS. BLUEMEL.